Dec. 2, 1952          R. G. BAUGHMAN          2,619,739
COAL DRIER
Filed Jan. 23, 1950          5 Sheets-Sheet 1
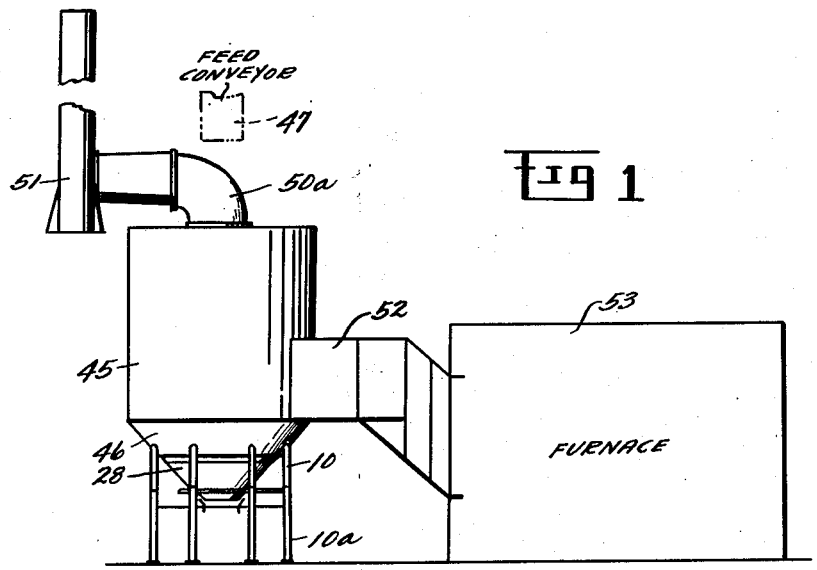
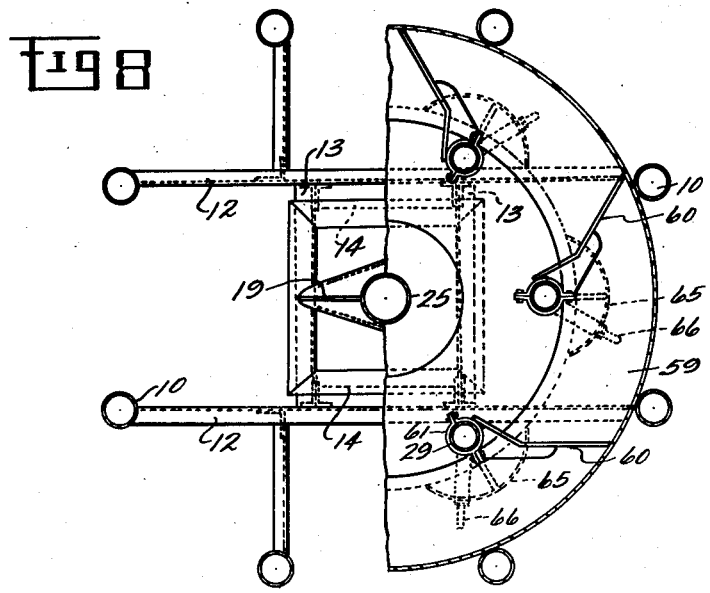
INVENTOR.
RAY G. BAUGHMAN
BY
*ATTORNEY*

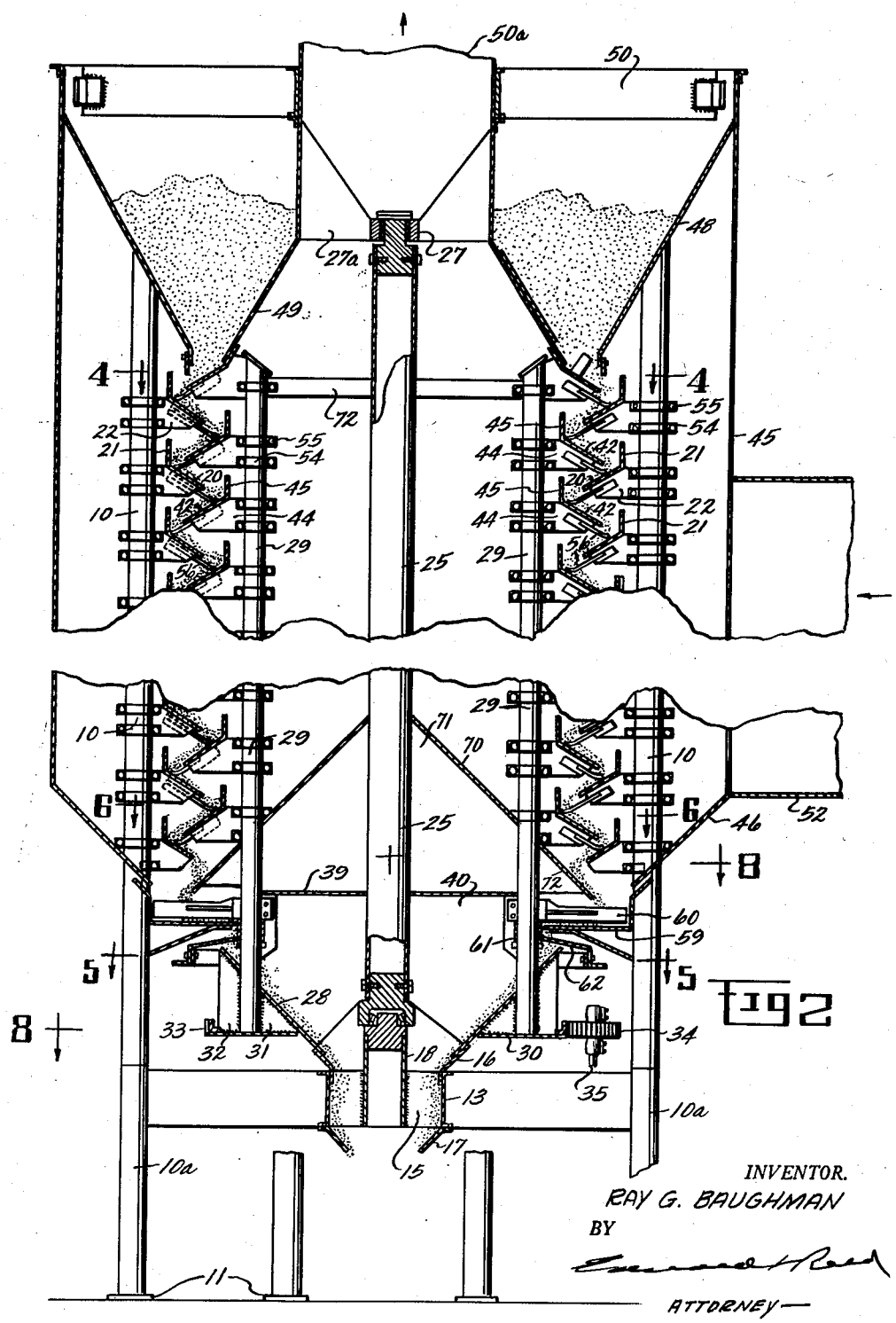

Dec. 2, 1952  R. G. BAUGHMAN  2,619,739
COAL DRIER
Filed Jan. 23, 1950  5 Sheets-Sheet 3
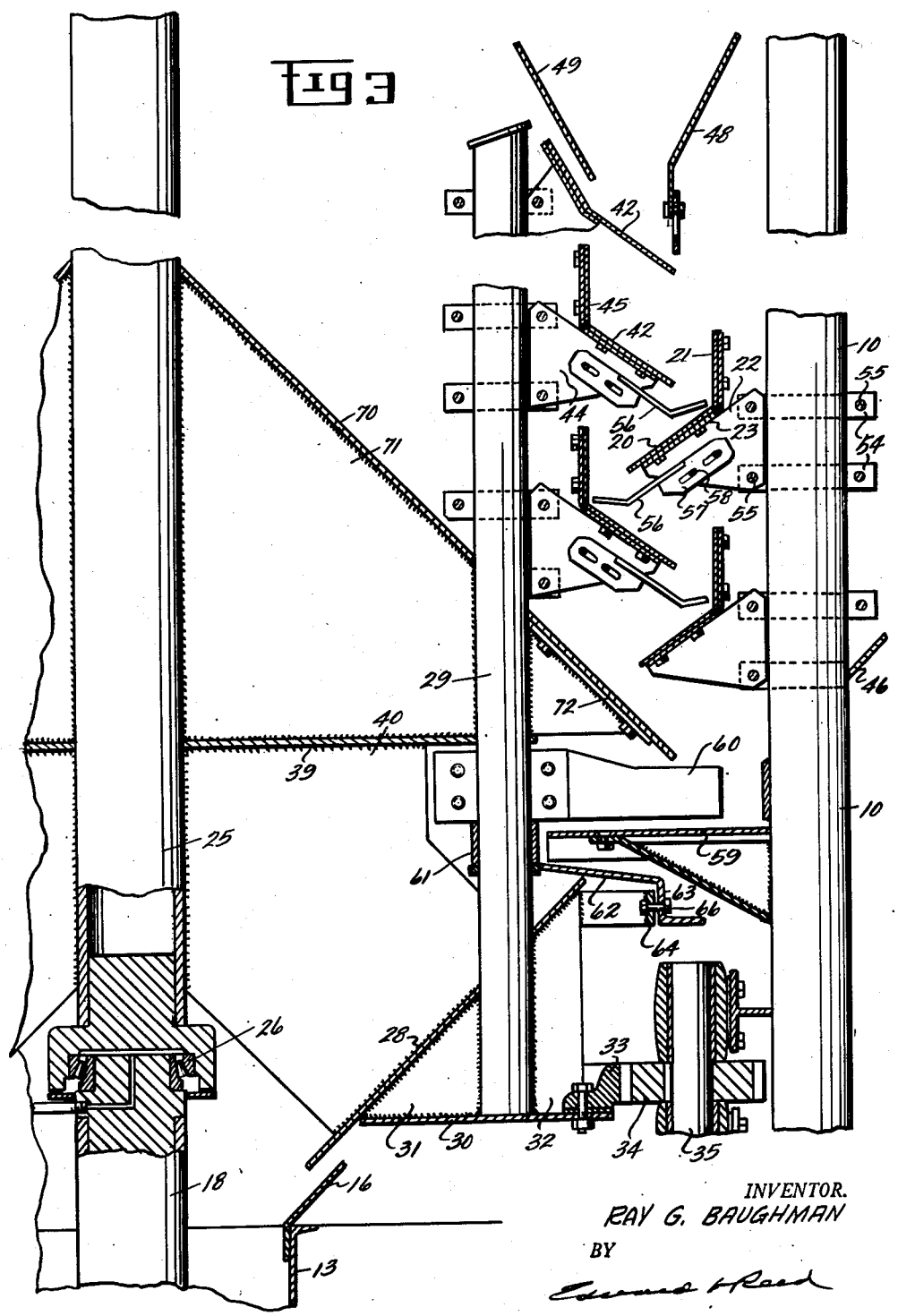
INVENTOR.
RAY G. BAUGHMAN
BY
ATTORNEY

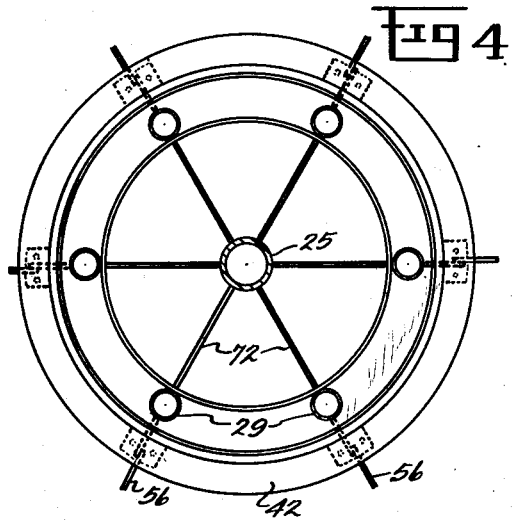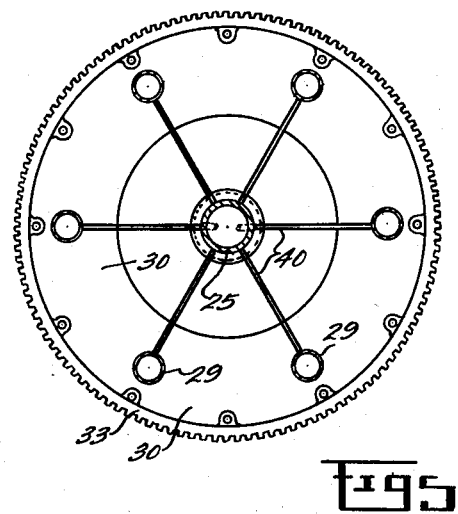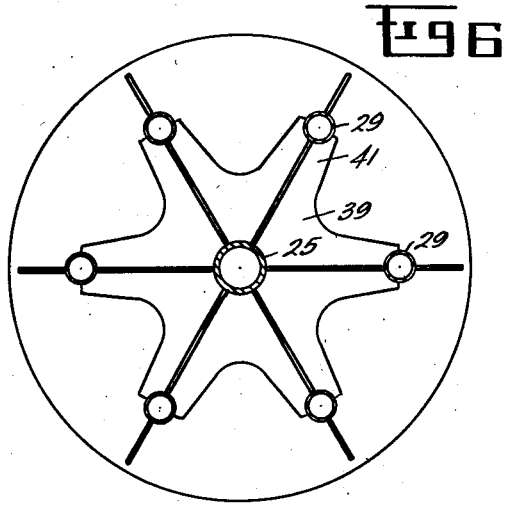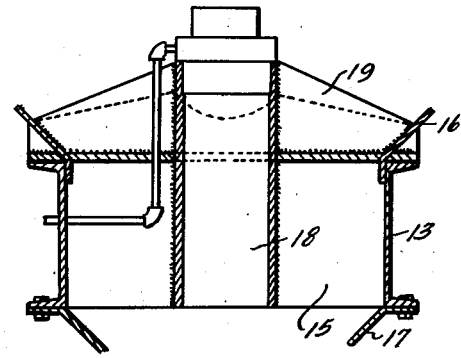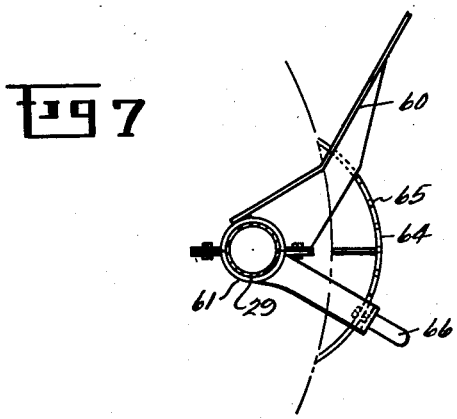
INVENTOR.
RAY G. BAUGHMAN
BY
ATTORNEY Dec. 2, 1952   R. G. BAUGHMAN   2,619,739
COAL DRIER
Filed Jan. 23, 1950   5 Sheets-Sheet 5
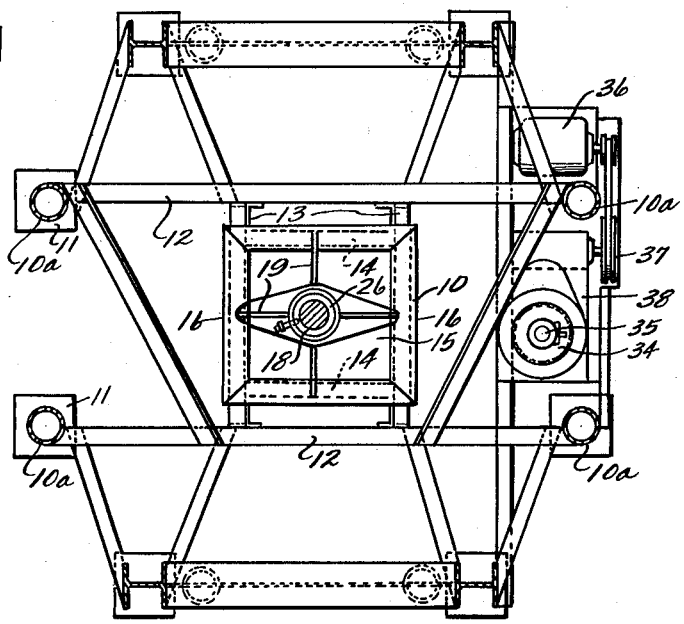
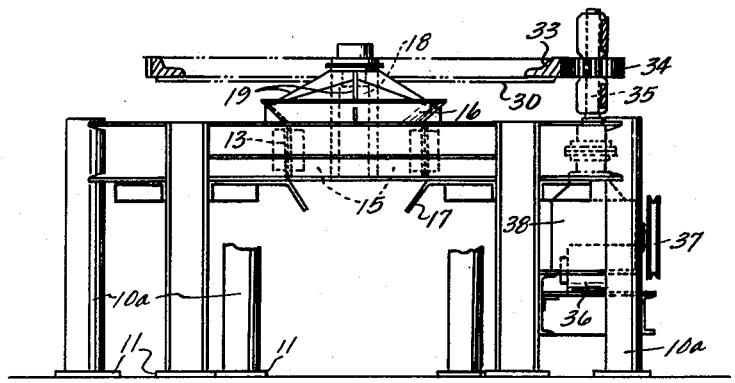
INVENTOR.
RAY G. BAUGHMAN
BY
ATTORNEY—

Patented Dec. 2, 1952

2,619,739

UNITED STATES PATENT OFFICE 2,619,739

COAL DRIER

Ray G. Baughman, Linton, Ind., assignor of one-half to Robert Hartley Sherwood, Indianapolis, Ind.

Application January 23, 1950, Serial No. 140,048

14 Claims. (Cl. 34—173)

This invention relates to a coal drier and is in the nature of an improvement on the drier shown in Patent No. 2,478,804 granted to me on August 9, 1949.

One object of the invention is to provide a drier of the type comprising inner and outer vertical series of annular shelves having improved means for supporting and rotating the inner series of shelves.

A further object of the invention is to provide means for regulating the rate of flow of material to be dried through the drier.

A further object of the invention is to provide such a drier with an adjustable plow to control the rate of the discharge of the material therefrom and thus control the rate of movement of the material through the drier.

A further object of the invention is to provide such a drier with means for controlling the thickness of the stream of material moving through the drier to permit the free passage of a drying medium therethrough.

A further object of the invention is to provide such a drier with means for agitating the material on the shelves and maintaining the same in a loose, freely moving condition.

Other objects of the invention may appear as the drier is described in detail.

In the accompanying drawings, Fig. 1 is a side elevation of a drier embodying the invention; Fig. 2 is a vertical section taken centrally through the drier and partly broken away; Fig. 3 is a vertical section taken through a portion of one side of the drier, on a larger scale; Fig. 4 is a section through the rotatable structure taken on the line 4—4 of Fig. 2; Fig. 5 is a similar section taken on the line 5—5 of Fig. 2; Fig. 6 is a similar section taken on the line 6—6 of Fig. 2; Fig. 7 is a plan view of one of the plows; Fig. 8 is a section taken on the line 8—8 of Fig. 2; Fig. 9 is a plan view of the base structure of the drier; Fig. 10 is a side elevation of the base structure; and Fig. 11 is a section taken on the line 11—11 of Fig. 9.

In these drawings I have illustrated one embodiment of the invention and have shown the same as designed for drying coal, but it is to be understood that the drier as a whole, as well as the several parts thereof, may take various forms and may be used for drying materials of various kinds without departing from the spirit of the invention.

In the form here shown the drier comprises a stationary outer annular structure and a rotatable inner annular structure, said structures being provided with oppositely inclined shelves forming a tortuous passage through the drier, and means for circulating a drying medium through the stream of material as it moves through that tortuous passage. Preferably the outer structure comprises an annular series of upright stationary standards 10, in the present instance, eight. The several standards are rigidly supported at their lower ends on the respective standards of a second series of standards, 10a, which constitute the support for the drier as a whole. The corresponding standards, 10 and 10a, may, if desired, be formed in one piece from a single section of tubular material, or the like, but for convenience in manufacture and erection the lower portions 10a of the standards are formed separately from the upper portions 10 thereof and are mounted on suitable foundations 11, and the upper portions of the standards are rigidly connected with the lower portions thereof when the drier is erected in the place where it is to operate. The lower portions, 10a, of the standards are rigidly connected one with the other by a base frame which is preferably formed from a plurality of structural bars including two substantially parallel bars 12, each supported at its respective ends on two of the lower standards 10a. Extending between and rigidly secured to the bars 12 are two cross bars 13 which are connected one with the other by transverse bars 14 to form a rectangular passage 15 through the base frame. This passage constitutes the discharge passage of the drier and each of the bars 13 and 14 is provided at its upper edge with an outwardly extending flange 16 and at its lower edge with a downwardly converging flange 17, thus constituting in effect a hopper through which the dried material is discharged to a conveyor or chute, not shown.

Rigidly mounted on the bars 13 and 14, in the passage between the same, is an upright post 18 which is rigidly secured to said bars by gusset plates 19 which are welded at their respective edges to the cross bars and to other bars, the purpose of which will hereinafter appear.

Mounted on the outer series of standards 10 is a vertical series of inwardly and outwardly inclined annular shelves 20, each shelf being preferably provided at its upper edge with an upwardly extending part 21. These shelves may be mounted on the standards in any suitable manner. As here shown each shelf is mounted on a series of brackets 22 rigidly secured to the respective standards and each having an inclined upper surface to which is secured a plate 23 on which the inclined portions of the shelves are mounted and to which they may be secured in any suitable manner, as by bolts 24.

The inner rotatable structure may take various forms but preferably it comprises a vertical shaft 25 supported adjacent the center of the annular series of outer standards and rotatably supported at its lower end on the post 18, a bearing 26 being interposed between the post and the shaft. This bearing may be of any suitable character and is here shown as a tapered-roller bearing. The upper end of the shaft is rotatably supported in a fixed bearing 27 which is preferably formed of a material that does not require lubrication, such as Oilite. Supported on the lower portion of the shaft, above the bearing 26, is a hopper 28 which is arranged to receive dried material from the shelves and discharge the same through the passage 15 in the base frame, and is rigidly connected with the shaft 25 for rotation therewith. An annular series of upright inner standards 29 extend through and are secured to the inclined wall of the hopper 28, and rigidly secured to the lower ends of the standards 29 is an annular plate, or rotating platform, 30. The plate is rigidly secured to the hopper 28 and to the standards by gusset plates 31 and 32 which are welded, or otherwise rigidly secured, to the hopper, the annular plate and the standards. Rigidly secured to the peripheral portion of the annular plate 30 is an annular gear 33 which meshes with a pinion 34 on a shaft 35 which is driven from an electric motor 36 through a belt pulley 37 and a variable speed mechanism 38. The hopper 28 is secured to the shaft and to a transverse plate 39 by gusset plates 40, and the plate 39 is provided with radial portions, or arms, 41, which embrace and are rigidly secured to the respective inner standards 29.

Mounted on and extending about the inner series of standards 29 is a vertical series of downwardly and outwardly inclined annular shelves 42, which have upwardly extending parts 43 and are secured to the inner standards by brackets 44 similar to the brackets 22 which connect the outer shelves to the outer standards. Each inner shelf 42 is supported in a substantially horizontal plane between the horizontal planes of the adjacent outer shelves and the outer edge of each inner shelf terminates above the inclined portion of the next lower outer shelf and is spaced inwardly from the upright portion of the outer shelf. Thus the two series of shelves form between the same a tortuous passage through which moves the material to be dried.

Mounted about the shaft 25 in the space within the inner annular series of shelves is a frusto-conical baffle 70 through the upper end, or apex, of which the shaft extends and through which the inner standards 29 extend. The baffle is secured to the shaft and to the standards by gusset plates 71 welded, or otherwise secured, to the baffle, the shaft and the standards. The lower outer portion 72 of the baffle extends outwardly beyond the inner standards and below the lowermost shelf of the inner series.

Mounted about and supported on the standards of the outer series and spaced outwardly therefrom is a housing, or shell, 45 the upper end of which extends above the outer standards and the lower portion 46 of which is deflected inwardly and rigidly secured to the outer standards below the brackets for the lowermost outer shelf. Mounted in the upper portion of the housing is an annular hopper which is arranged to receive material to be dried from a suitable source, such as the conveyor 47 in Fig. 1, and deliver the same to the upper end of the tortuous passage between the inner and outer shelves. In the arrangement here shown, the outer wall 48 of the hopper is rigidly secured to the upper ends of the outer series of standards and is welded, or otherwise secured, at its upper edge to the housing 45. The inner wall 49 of the hopper is frusto-conical in form and converges downwardly toward the inclined outer wall 48 to provide a relatively narrow annular mouth which discharges the material onto the uppermost shelf of one series of shelves, in the present instance the uppermost inner shelf. This inner wall 49 is supported by cross bars 50 secured to the upper ends of the housing, and includes a tubular extension, or flue, 50a connected with an exhaust fan, or the like, shown schematically at 51, which serves to draw air or other drying medium from the interior of the rotary supporting structure. The upper bearing 27 for the shaft 25 is supported centrally of the hopper wall 49 by gusset plates 27a.

The housing 45 is spaced outwardly from the outer series of standards and is connected by a conduit 52 with a source of drying medium, such as heated air, and here shown as a furnace 53. The drying medium is delivered to the housing and circulates entirely about the two series of shelves and through the stream of material flowing through the tortuous passage between those shelves and thus dries the material as it moves through the drier. The exhaust fan draws the drying medium from the housing through the stream of material moving between adjacent shelves, and the baffle 70 substantially seals the lower end of the inner rotatable structure to prevent the entrance of air thereto from below, so that the whole force of the exhaust fan is utilized to draw air through the material. Further, this baffle returns any fine material, which may be drawn into the space within the inner shelves, back to the stream of material flowing through the tortuous passage.

The resistance of the material to the passage of the drying medium through the fan, varies in accordance with the character of the material, very finely divided materials offering a greater resistance than do coarser materials. In order that the drier may be adapted to properly dry materials of various sizes, there is provided means for regulating the thickness of the stream of material flowing through the tortuous passage. Preferably this is accomplished by making the shelves of both series vertically adjustable on the standards so as to vary the distance between the lower edge of one shelf and the inclined surface of the next lower shelf, thus causing the material to flow over the shelves in a stream of a thickness determined by the spacing of the shelves one from the other. The shelves may be adjusted with relation to the respective standards in any suitable manner, preferably by clamping them thereto. In the present arrangement each shelf supporting bracket is provided with two clamping devices, here shown as two-part rings, 54, the adjacent ends of each ring being connected one to the other by bolts 55. That edge portion of each bracket which is adjacent the standard extends between the adjacent ends of the two parts of each clamping ring and is secured therein by the bolts 55. By tightening the bolts in the other ends of the rings the latter may be tightly clamped about the standard and the shelf rigidly secured to the standard, and by loosening the bolts in the last mentioned ends of the clamping rings the latter may be vertically adjusted on the standard to a desired position and then clamped in that position.

The material being dried, particularly the finer materials, sometimes has a tendency to accumulate or pack on the shelves, and it is desirable to so agitate the materials as to prevent such packing and keep the material in a loose, free flowing condition. For that purpose agitators, or stirring fingers, 56, may be attached to the shelves, or a part of the shelves, of either or both series of shelves, each agitating finger being connected with a shelf of one series and extending to a point adjacent the material supporting surface of the next lower shelf. In the present instance, each agitating finger is rigidly secured to a slotted plate 57 which is mounted on the shelf supporting bracket 22, by bolts 58, so that it may be adjusted longitudinally to a desired position with relation to the lower shelf. The agitating fingers on the inner series of shelves rotate with the shelves and move through the material on the outer shelves. The agitating fingers on the outer shelves have no movement but the material on the inner shelves moves with relation to the fingers which extend into the same and is thus agitated.

Means are also provided for controlling the flow of material through the tortuous passage and the rate at which it so flows. In the present drier a stationary shelf 59 is supported in a substantially horizontal position below the discharge end of the tortuous passage and in a position in which all of the material discharged from the passage is deposited on the shelf. A material removing member or plow 60 removes the material from the shelf and delivers the same to the hopper 28. This plow is preferably adjustable to cause it to extend across a selected portion of the surface of the shelf 59 and thus to remove from the shelf a quantity of material determined by its position with relation to the shelf. Preferably this plow is rigidly secured to a sleeve 61 rotatably supported on one of the inner standards 29 and extends outwardly over the shelf and forwardly in the direction of rotation of the inner standards. Means are provided for adjustably securing the plow in a fixed position with relation to the shelf. This means may take various forms and as here shown a lever, or arm, 62 is rigidly secured to the sleeve 61, preferably below the shelf 59, and has a part 63 extending downwardly across a segmental strip 64 of rigid material which is rigidly secured at its ends to a fixed part of the rotatable structure. In the present arrangement the segmental strip is provided with a series of openings 65 and a bolt 66 extends through an opening in the downwardly extending part of the lever and through a selected one of the openings in the segmental strip. The lever being rigidly secured to the sleeve the movement of the lever adjusts the plow with relation to the standard and to the shelf 59 and the bolt rigidly secures the plow in its adjusted position. By removing the bolt the lever may be moved to adjust the plow to selected position and then locked to the segmental strip by again inserting the bolt. There may be one or more of these plows and preferably a plow is connected with each of the inner standards, as shown in Fig. 8. The plows, or plow, control the flow of material through the tortuous passage and the material can so flow only when the inner rotatable structure is in motion. The plows remove from the shelves portions of the material determined by the adjustment of the plows and the material can move through the passage only as fast as the material is removed from the shelf 59, thus the adjustment of the plow determines the rate at which the material will flow through the drier at a given speed of the rotation of the rotatable inner structure. Further, the speed of the rotation of the inner structure determines the speed at which the material will be discharged from the shelf 59 with each of the plows set in a given position. Thus the rate of flow of the material can be controlled by adjusting the variable speed mechanism, by adjusting the plows or by making both adjustments.

While I have shown and described one embodiment of my invention, I wish it to be understood that I do not desire to be limited to the details thereof as various modifications may occur to a person skilled in the art.

Having fully shown and described my invention, what I claim as new and desire to secure by Letters Patent, is:

1. A drier comprising an outer annular series of stationary upright standards, a vertical series of inwardly and downwardly inclined annular shelves within and supported by said annular series of standards in vertically spaced relation one to the other, a vertical shaft rotatably supported substantially at the axis of the said outer series of standards, an inner annular series of upright standards supported by and spaced radially from said shaft for rotation therewith, a vertical series of downwardly and vertically inclined annular shelves extending about and supported by said inner series of standards, the shelves of the two series being arranged to form a tortuous passage between the same, means for delivering material to be dried to the upper end of said passage, and means for rotating said shaft.

2. A drier comprising an outer annular series of stationary upright standards, a vertical series of inwardly and downwardly inclined annular shelves within and supported by said annular series of standards in vertically spaced relation one to the other, a vertical shaft rotatably supported substantially at the axis of the said outer series of standards, an annular member rigidly connected with said shaft adjacent the lower end thereof, an inner annular series of upright standards supported on said annular member in laterally spaced relation to said shaft and rigidly connected with said annular member and said shaft, a vertical series of downwardly and outwardly inclined annular shevles extending about and supported by said inner series of standards, the shelves of the two series being arranged to form a tortuous passage between the same, means for delivering material to be dried to the upper end of said passage, and means for rotating said shaft.

3. A drier comprising an outer annular series of stationary upright standards, a vertical series of inwardly and downwardly inclined annular shelves within and supported by said annular series of standards in vertically spaced relation one to the other, a vertical shaft rotatably supported substantially at the axis of said outer series of standards, an annular member rigidly connected with said shaft adjacent the lower end thereof, an inner annular series of upright standards supported on said annular member in laterally spaced relation to said shaft and rigidly connected with said annular member and said shaft, a vertical series of downwardly and outwardly inclined annular shelves extending about and supported by said inner series of standards, the shelves of the two series being arranged to form a tortuous passage between the same, an annular gear secured to said annular member, a pinion meshing with said gear, and means for rotating said pinion.

4. A drier comprising an outer annular series of stationary upright standards, a vertical series of inwardly and downwardly inclined annular shelves within and supported by said annular series of standards in vertically spaced relation one to the other, a vertical shaft rotatably supported substantially at the axis of said outer series of standards, an annular member rigidly connected with said shaft adjacent the lower end thereof, an inner annular series of upright standards supported on said annular member in laterally spaced relation to said shaft and rigidly connected with said annular member and said shaft, a frustro-conical member extending about said shaft, having its upper portion rigidly connected with an intermediate portion of said shaft and having its lower portion rigidly connected with the standards of said inner series, a vertical series of downwardly and outwardly inclined annular shelves extending about and supported by said series of inner standards, the shelves of the two series being arranged to form a tortuous passage between the same, means for delivering material to be dried to the upper end of said passage, and means for rotating said shaft.

5. A drier comprising an outer annular series of stationary upright standards, a vertical series of inwardly and downwardly inclined annular shelves within and supported by said annular series of standards in vertically spaced relation one to the other, a vertical shaft rotatably supported substantially at the axis of the said outer series of standards, an annular member rigidly connected with said shaft adjacent the lower end thereof, an inner annular series of upright standards supported on said annular member in laterally spaced relation to said shaft and rigidly connected with said annular member and said shaft, a vertical series of downwardly and outwardly inclined annular shelves extending about and supported by said inner series of standards, the shelves of the two series being arranged to form a tortuous passage between the same, a frustro-conical baffle supported about said shaft extending downwardly and outwardly beyond the said inner series of standards and below the lowermost shelves of said series of shelves, and means for rotating said shaft.

6. A drier comprising an outer annular series of stationary upright standards, a vertical series of inwardly and downwardly inclined annular shelves within and supported by said annular series of standards in vertically spaced relation one to the other, a vertical shaft rotatably supported substantially at the axis of the said outer series of standards, an annular member rigidly connected with said shaft adjacent the lower end thereof, an inner annular series of upright standards supported on said annular member in laterally spaced relation to said shaft and rigidly connected with said annular member and said shaft, a vertical series of downwardly and outwardly inclined annular shelves extending about and supported by said inner series of standards, the shelves of the two series being arranged to form a tortuous passage between the same, means for delivering material to be dried to the upper end of said passage, a hopper rigidly secured to said shaft, extending through said annular member and arranged to receive material from the lower end of said tortuous passage, and means for rotating said shaft.

7. A drier comprising an outer series of upright standards, a vertical series of inwardly and downwardly inclined inner shelves within and supported by said annular series of standards in vertically spaced relation one to the other, a base including an upright supporting member, a bearing on the upper end of said member, a vertical shaft supported on said bearing for rotation thereon, an inner annular series of upright standards supported by and spaced radially from said shaft for rotation therewith, a vertical series of downwardly and outwardly inclined annular shelves extending about and supported by said inner series of standards, the shelves of the two series being arranged to form a tortuous passage between the same, means for delivering material to be dried to the upper end of said passage, and means for rotating said shaft.

8. A drier comprising an outer annular series of stationary upright standards, a vertical series of inwardly and downwardly inclined annular shelves within and supported by said annular series of standards in vertically spaced relation one to the other, a base including an upright supporting member, a bearing on the upper end of said supporting member, a vertical shaft rotatably supported on said bearing, an annular member rigidly connected with said shaft adjacent the lower end thereof, an inner annular series of upright standards supported on said annular member in laterally spaced relation to said shaft, a vertical series of downwardly and outwardly inclined annular shelves extending about and supported by said inner series of standards, the shelves of the two series being arranged to form a tortuous passage between the same, means for delivering material to be dried to the upper end of said passage, a hopper rigidly secured to said shaft, extending through said annular member and arranged to receive material from the lower end of said tortuous passage, a stationary hopper supported below said shaft, extending about and spaced from said supporting member and arranged to receive material from the first mentioned hopper, and means for rotating said shaft and said inner standards.

9. A drier comprising an outer annular series of stationary upright standards, a vertical series of inwardly and downwardly inclined annular shelves within and supported by said annular series of standards in vertically spaced relation one to the other, a base including an upright supporting member, a bearing on the upper end of said supporting member, a vertical shaft rotatably supported on said base, an inner annular series of upright standards supported by said shaft in radially spaced relation thereto and connected with said shaft for rotation therewith, a vertical series of downwardly and outwardly inclined annular shelves extending about and supported by said inner series of standards, the shelves of the two series being arranged to form a tortuous passage between the same, means for delivering material to be dried to the upper end of said passage, a hopper rigidly connected with the lower portion of said shaft, extending about the axis thereof and arranged to receive material from said tortuous passage, said inner standards extending downwardly through and beyond said hopper, an annular plate extending about the lower portion of said hopper and rigidly secured to said hopper and to the lower ends of said inner standards, an annular gear secured to said plate, a pinion meshing with said gear, and means for driving said pinion.

10. In a drier, an outer supporting structure, a vertical series of downwardly and inwardly inclined annular shelves mounted on said structure, a rotatable supporting structure within said outer structure, a vertical series of downwardly and outwardly inclined annular shelves mounted on said rotatable structure for rotation therewith, the two series of shelves being arranged to form a tortuous passage between the same, a substantially horizontal stationary annular shelf supported below said passage to receive and guide material therefrom, a hopper below said stationary shelf, a plow mounted on a fixed part of said rotatable structure for adjustment about a vertical axis and extending outwardly and forwardly from said part of said structure above said horizontal shelf to move material from said shelf to said hopper, a segmental member secured to said rotatable structure below said plow, a lever connected with said plow and having a part movable over said segmental member, means for securing said lever to said plow in adjusted positions with relation thereto, and means for rotating said rotatable structure.

11. A drier comprising an outer annular series of stationary upright standards, a vertical series of inwardly and downwardly inclined annular shelves within and supported by said annular series of standards in vertically spaced relation one to the other, a vertical shaft rotatably supported substantially at the axis of the said outer series of standards, an inner annular series of upright standards supported by and spaced radially from said shaft for rotation therewith, a vertical series of downwardly and vertically inclined annular shelves extending about and supported by said inner series of standards, the shelves of the two series being arranged to form a tortuous passage between the same, means for delivering material to be dried to the upper end of said passage, a horizontal annular shelf supported on said outer series of standards in a fixed position below said passage, a plow pivotally mounted on one of said inner standards and extending outwardly and forwardly above said horizontal shelf, a lever rigidly secured to said plow adjacent the pivotal axis thereof, means for securing said lever in adjusted positions about said pivotal axis to rigidly retain the plow in adjusted positions with relation to said horizontal shelf, and means for rotating said shaft.

12. A drier comprising an outer annular series of stationary upright standards, a vertical series of downwardly and inwardly inclined annular shelves within and supported by said annular series of standards in vertically spaced relation one to the other, a second series of annular upright standards supported within said annular shelves for rotation about a vertical axis with relation thereto, a vertical series of downwardly and outwardly inclined annular shelves extending about and supported by said second series of standards for rotation therewith, the downwardly inclined part of each shelf of each series being in a line intersecting a part of the next lower shelf of the other series and being spaced therefrom to form a tortuous passageway between the two series of shelves, means for delivering material to be dried to the upper end of said passage, means for rotating said second series of standards, means for circulating a drying medium through the stream of material moving through said passage and means for connecting said shelf with the respective series of standards for vertical adjustment with relation thereto to vary the thickness of said stream of material.

13. A drier comprising an outer series of upright standards, a series of inwardly extending and vertically spaced brackets secured to each of said standards, a vertical series of downwardly and inwardly inclined annular shelves supported by said brackets, an inner series of upright standards supported within said shelves for rotation about a vertical axis with relation thereto, a vertical series of brackets secured to each standard of said inner series of standards and extending outwardly therefrom in substantially horizontal planes between adjacent vertically spaced brackets on said outer standards, a vertical series of downwardly and outwardly inclined shelves supported by the brackets on said inner series of standards for rotation therewith, the two series of shelves forming a tortuous passage between the same, means for delivering material to be dried to the upper end of said passage, means for rotating said second series of standards, and a plurality of material agitating elements mounted respectively on vertically spaced shelf supporting brackets on one of said series of standards, each agitating element extending into the path of the material on the next lower shelf on the other of said series of standards.

14. A drier comprising an outer series of upright standards, a series of inwardly extending and vertically spaced brackets secured to each of said standards, a vertical series of downwardly and inwardly inclined annular shelves supported by said brackets, an inner series of upright standards supported within said shelves for rotation about a vertical axis with relation thereto, a vertical series of brackets secured to each standard of said inner series of standards and extending outwardly therefrom in substantially horizontal planes between adjacent vertically spaced brackets on said outer standards, a vertical series of downwardly and outwardly inclined shelves supported by the brackets on said inner series of standards for rotation therewith, the two series of shelves forming a tortuous passage between the same, means for delivering material to be dried to the upper end of said passage, and a plurality of material agitating elements mounted respectively on shelf supporting brackets on the two series of standards, each element on each series of standards extending to a point adjacent the material supporting surface of a shelf on the other series of standards, and means for adjusting each agitating element with relation to the shelf toward which it extends.

RAY G. BAUGHMAN.

REFERENCES CITED

The following references are of record in the file of this patent:

UNITED STATES PATENTS

| Number | Name | Date |
|---|---|---|
| 589,334 | Butler | Aug. 31, 1897 |
| 1,383,921 | Fredel et al. | July 5, 1921 |
| 1,410,063 | Huillard | Mar. 21, 1922 |
| 2,049,199 | Dornfeld | July 28, 1936 |
| 2,478,804 | Baughman | Aug. 9, 1949 |

FOREIGN PATENTS

| Number | Country | Date |
|---|---|---|
| 504,956 | Great Britain | May 3, 1939 |